(12) United States Patent
Abdel-Khalik et al.

(10) Patent No.: US 11,621,598 B2
(45) Date of Patent: Apr. 4, 2023

(54) TORQUE DENSITY PSEUDO SIX-PHASE INDUCTION MACHINE

(71) Applicant: QATAR UNIVERSITY, Doha (QA)

(72) Inventors: Ayman Abdel-Khalik, Alexandria (EG); Ahmed Massoud, Doha (QA); Shehab Ahmed, Thuwal (SA)

(73) Assignee: QATAR UNIVERSITY, Doha (QA)

( * ) Notice: Subject to any disclaimer, the term of this patent is extended or adjusted under 35 U.S.C. 154(b) by 309 days.

(21) Appl. No.: 16/814,108

(22) Filed: Mar. 10, 2020

(65) Prior Publication Data

US 2021/0288539 A1    Sep. 16, 2021

(51) Int. Cl.
    *H02K 3/28*      (2006.01)
    *H02K 19/10*     (2006.01)
    *H02K 3/12*      (2006.01)

(52) U.S. Cl.
    CPC ............... *H02K 3/28* (2013.01); *H02K 3/12* (2013.01); *H02K 19/10* (2013.01)

(58) Field of Classification Search
    CPC ............ H02K 3/28; H02K 3/12; H02K 19/10; H02K 2213/03
See application file for complete search history.

(56) References Cited

U.S. PATENT DOCUMENTS

| | | | |
|---|---|---|---|
| 5,231,324 A | 7/1993 | Kawamura et al. | |
| 2014/0346910 A1* | 11/2014 | Nakano | H02K 3/28 310/156.01 |
| 2016/0329767 A1* | 11/2016 | Umeda | H02K 1/2706 |
| 2020/0099327 A1* | 3/2020 | Nas | H02K 3/28 |

FOREIGN PATENT DOCUMENTS

| | | |
|---|---|---|
| CN | 1588759 A | 3/2005 |
| CN | 202068289 U | 12/2011 |
| CN | 202094723 U | 12/2011 |
| CN | 107742930 A | 2/2018 |
| CN | 108258868 A | 7/2018 |
| JP | 2018-110481 A | 7/2018 |
| JP | 6432579 B2 * | 12/2018 |
| WO | WO-2017130701 A1 * | 8/2017 ............... H02K 1/14 |

OTHER PUBLICATIONS

Machine Translation, AIKI, JP-6432579-B2, Dec. 2018. (Year: 2018).*
Machine Translation, Kanazawa, WO-2017130701-A1, Aug. 2017. (Year: 2017).*
G. K. Singh, et al., "Modeling and Analysis of Six-Phase Synchronous Motor Under Fault Condition", Chinese Journal of Electrical Engineering, vol. 3, No. 2, Sep. 2017, 14 pages.
Alejandro G. Yepes, et al., "Improvement of Postfault Performance of Multiphase Drives in Terms of Operating Region and Stator Copper Loss", IECON 2018, Oct. 21-23, 2018, 6 pages.

* cited by examiner

*Primary Examiner* — Thomas Truong
(74) *Attorney, Agent, or Firm* — Squire Patton Boggs (US) LLP

(57) ABSTRACT

A method may include providing a stator. The method may also include equipping the stator with quadruple three-phase winding sets with concentrated fully-pitched winding. The quadruple three-phase winding sets may be connected in such a way that emulates a six-phase stator. Further, the quadruple three-phase winding sets may have the same conductor cross-sectional area. In addition, the quadruple three-phase winding sets may include a plurality of winding groups.

10 Claims, 7 Drawing Sheets

Table I. Optimal Currents under Different Postfault Strategies for The Proposed P6P and the Traditional A6P Windings.

| Neutral arrangement | 2N | | 1N | |
|---|---|---|---|---|
| Winding | P6P | A6P [23] | P6P | A6P [23] |
| Max. Torque (MT) | | | | |
| Optimal currents, pu $\begin{bmatrix} \bar{I}_{a1} \\ \bar{I}_{b1} \\ \bar{I}_{c1} \\ \bar{I}_{a2} \\ \bar{I}_{b2} \\ \bar{I}_{c2} \end{bmatrix}$ | $\begin{bmatrix} 0 \\ 1.723\angle-93.1° \\ 1.723\angle86.9° \\ 1.723\angle-6.92° \\ 1.723\angle-186.9° \\ 0 \end{bmatrix} \cdot e^{j\omega_5 t}$ | $\begin{bmatrix} 0 \\ 1.732\angle-90° \\ 1.732\angle90° \\ 1.732\angle0° \\ 1.732\angle-180° \\ 0 \end{bmatrix} \cdot e^{j\omega_5 t}$ | $\begin{bmatrix} 0 \\ 1.472\angle-88.9° \\ 1.472\angle143.2° \\ 1.472\angle-18.4° \\ 1.472\angle171.5° \\ 1.472\angle34.7° \end{bmatrix} \cdot e^{j\omega_5 t}$ | $\begin{bmatrix} 0 \\ 1.44\angle-85.4° \\ 1.44\angle145.9° \\ 1.44\angle-13° \\ 1.44\angle178.5° \\ 1.44\angle39.4° \end{bmatrix} \cdot e^{j\omega_5 t}$ |
| $P_{loss}$, pu | 1.98 | 2 | 1.8 | 1.73 |
| $T_x$, pu | 0.5803 × 1.05 = 0.61 | 0.5774 | 0.679 × 1.05 = 0.713 | 0.694 |
| Min. Loss (ML) | | | | |
| Optimal currents, pu $\begin{bmatrix} \bar{I}_{a1} \\ \bar{I}_{b1} \\ \bar{I}_{c1} \\ \bar{I}_{a2} \\ \bar{I}_{b2} \\ \bar{I}_{c2} \end{bmatrix}$ | $\begin{bmatrix} 0 \\ 0.866\angle-90° \\ 0.866\angle90° \\ 1.784\angle-21.1° \\ 1.803\angle-169.1° \\ 0.9906\angle83.8° \end{bmatrix} \cdot e^{j\omega_5 t}$ | $\begin{bmatrix} 0 \\ 0.866\angle-90° \\ 0.866\angle90° \\ 1.803\angle-16.1° \\ 1.803\angle-163.9° \\ 1\angle90° \end{bmatrix} \cdot e^{j\omega_5 t}$ | $\begin{bmatrix} 0 \\ 1.005\angle-120.6° \\ 1.005\angle120.4° \\ 1.817\angle-20.7° \\ 1.197\angle-163.4° \\ 1.091\angle64.6° \end{bmatrix} \cdot e^{j\omega_5 t}$ | $\begin{bmatrix} 0 \\ 1.146\angle-130.9° \\ 1.146\angle130.9° \\ 1.867\angle-15.5° \\ 0.943\angle-148° \\ 1.12\angle63.4° \end{bmatrix} \cdot e^{j\omega_5 t}$ |
| $P_{loss}$, pu | 1.49 | 1.5 | 1.32 | 1.37 |
| $T_x$, pu | 0.554 × 1.05 = 0.582 | 0.554 | 0.55 × 1.05 = 0.578 | 0.536 |

FIG. 5

TORQUE DENSITY PSEUDO SIX-PHASE INDUCTION MACHINE

FIELD

Some embodiments may generally relate to induction or synchronous alternating current (AC) motors. More specifically, certain embodiments may relate to a pseudo six-phase (P6P) induction or synchronous motor using a quadruple three-phase stator winding.

BACKGROUND

In general, an alternating current (AC) motor may include two parts, an outside stator having coils supplied with alternating current to produce a rotating magnetic field, and an inside rotor attached to the output shaft producing a second rotating magnetic field. The rotor magnetic field may be produced by permanent magnets, reluctant saliency, or direct current (DC) or AC electrical windings.

Furthermore, AC motors may be divided into synchronous motors and asynchronous motors. Synchronous motors may include a stator that has axial slots, which include a stator winding for a specific number of poles. The rotor winding may be fed with a DC supply with the help of slip rings. Alternatively, a rotor with permanent magnets may be used. On the other hand, an asynchronous (e.g., induction) motor may include a stator winding that is similar to that of the synchronous motor. In particular, the stator winding in the induction motor may be wound for a specific number of poles.

Additionally, stators are generally characterized as the stationary part of a rotary system. Stators may be found in various implementations including, for example, in an electric generator or motor and an induction motor. During a stator's function, energy may flow through the stator to or from a rotating component of the system. For example, in an electric motor, the stator may provide a rotating magnetic field that drives the rotating armature. In a generator, the stator may convert the rotating magnetic field to electric current. In addition, in fluid powered devices, the stator may guide the flow of fluid to or from the rotating part of the system.

However, traditional phase motors are unable to employ a single layer fully-pitched stator winding with a unity winding factor and a 5% enhancement in the torque/current ratio. Traditional phase motors are also unable to employ a single layer winding that will crease the achievable winding fill factor and simplify the insulation requirements as well as the winding process, in general. Moreover, traditional phase motors are unable to eliminate leakage flux. Accordingly, there is a need for an improved induction machine that may use a quadruple three-phase stator winding.

SUMMARY

Certain embodiments may be directed to a pseudo six-phase machine. The pseudo six-phase machine may include a stator equipped with quadruple three-phase winding sets with concentrated fully-pitched winding. The quadruple three-phase winding sets may be connected in such a way that emulates a six-phase stator. In addition, the quadruple three-phase winding sets may have a same conductor cross-sectional area. Further, the quadruple three-phase winding sets may include a plurality of winding groups.

Other embodiments may be directed to a method of operating a pseudo six-phase machine. The method may include providing a stator. The method may also include equipping the stator with quadruple three-phase winding sets with concentrated fully-pitched winding. The quadruple three-phase winding sets may be connected in such a way that emulates a six-phase stator. Further, the quadruple three-phase winding sets may have the same conductor cross-sectional area. In addition, the quadruple three-phase winding sets may include a plurality of winding groups.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings:

FIG. 5 illustrates a table of optimal currents under different post-fault strategies for the P6P and the traditional A6P windings, according to an embodiment.

DETAILED DESCRIPTION

It will be readily understood that the components of certain example embodiments, as generally described and illustrated in the figures herein, may be arranged and designed in a wide variety of different configurations. The following is a detailed description of some embodiments of systems, methods, apparatuses, and/or computer program products for improving a torque density pseudo six-phase (P6P) induction machine using a quadruple three-phase stator winding.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar languages, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

Figure 1:
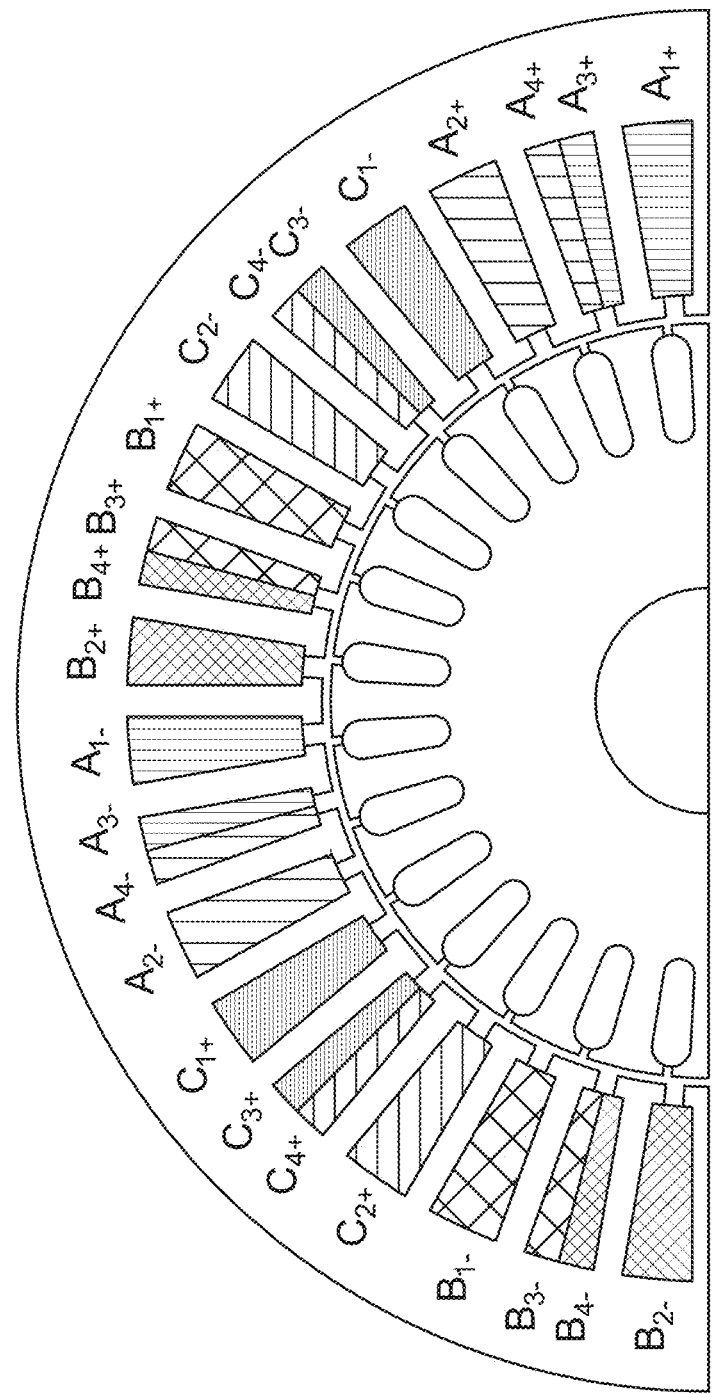
FIG. 1 illustrates a pseudo six-phase (P6P) winding layout, according to an embodiment.
Figure 2:
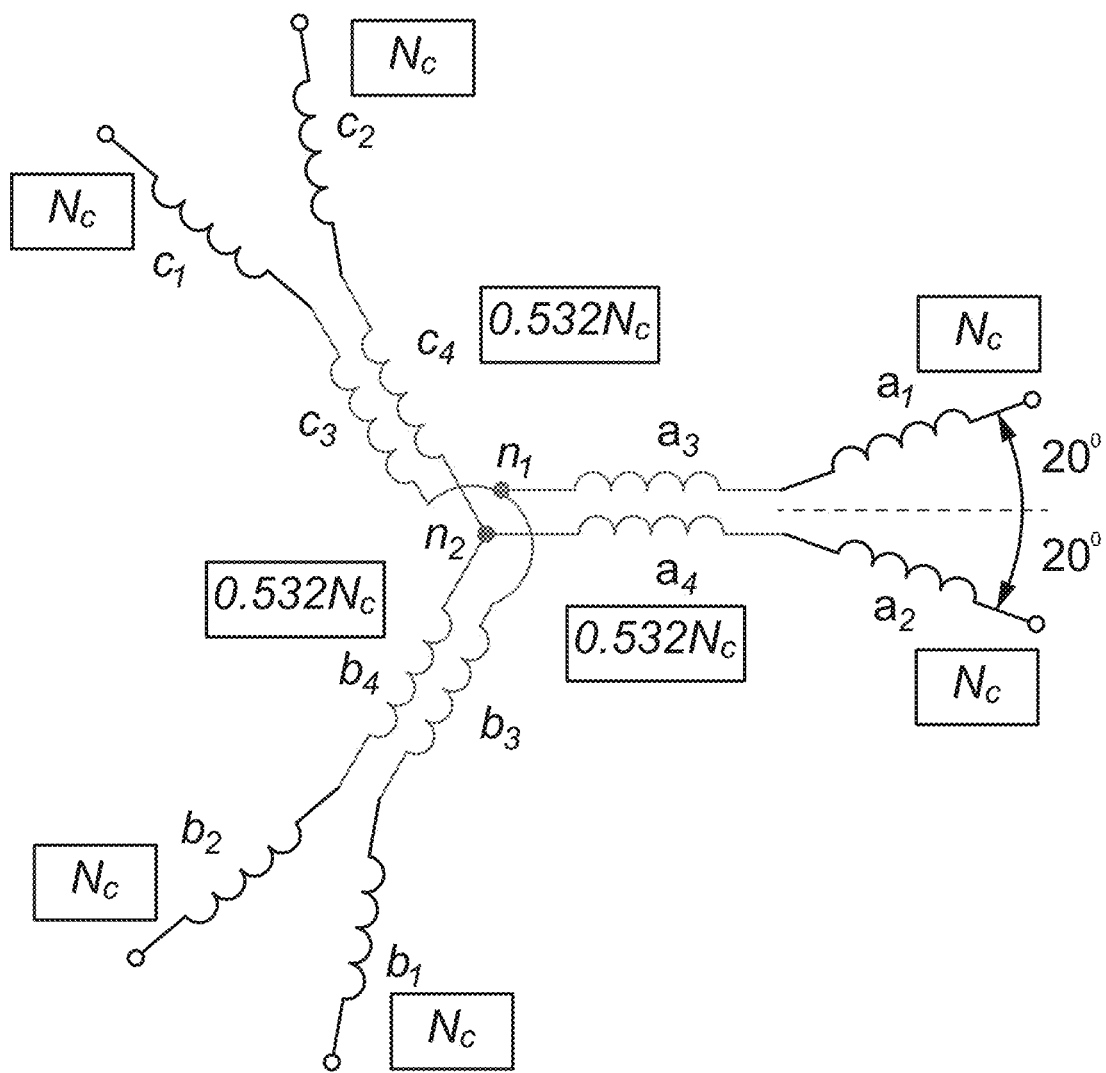
FIG. 2 illustrates a winding connection of the P6P, according to an embodiment.

FIG. 1 illustrates a pseudo six-phase (P6P) winding layout, according to an embodiment, and FIG. 2 illustrates a winding connection of the P6P, according to an example embodiment. In one embodiment, the stator may be equipped with quadruple three-phase sets with concentrated fully-pitched winding, which may be connected in such a way as to emulate a six-phase stator. According to an embodiment, the machine may be an induction motor type or a synchronous motor type.

In an embodiment, the four winding layouts may have the same conductor cross-sectional area. For example, the winding may be characterized as different groups, including groups abc1 and abc3 connected in series. Groups abc1 and abc3 may also form the first equivalent three-phase group of the P6P stator winding. Further, the remaining two winding groups abc2 and abc4 may also be connected in series to provide the second equivalent three-phase winding group. According to such an embodiment, it may be possible for the stator to be architecturally equivalent to a six-phase stator. In addition, according to an embodiment, the number of turns of the winding groups abc3 and abc4 may be 0.532 times the number of turns of the winding groups abc1 and abc2. According to such a configuration, it may be possible to ensure a balanced magnetomotive force (MMF) production from all sets.

According to an embodiment, the winding layout may stem from an asymmetrical nine-phase winding, which may include the same number of stator slots per pole. In this case, the winding groups abc3 and abc4 may be considered as one unit, and may be placed together during the winding process to preserve the single layer feature for this layout. For example, in one embodiment, the winding groups abc3 and abc4 may be placed together by being placed in the same slot during the process of placing the winding groups within the machine stator. In another embodiment, if the effective number of turns per phase is Nc and assuming a sinusoidal MMF production, the MMF production of either winding abc1 or winding abc2 may be $1.5N_cI_mAT$, which is about 1.5 times the MMF amplitude of a single phase. According to an embodiment, the Ampere-Turn (AT) production of the combination of winding groups abc3 and abc4 may be given by:

$$\bar{F}_{abc3}^{P6P} + \bar{F}_{abc4}^{P6P} = \qquad (1)$$
$$3/2(0.532N_c e^{-j20^e}) \cdot (I_m e^{-j0^0}) + 3/2(0.532N_c e^{-j20^0}) \cdot (I_m e^{-j40^0}) =$$
$$3/2(0.532N_c e^{-j20^0}) \cdot (I_m e^{-j0^0} + I_m e^{-j40^0}) =$$
$$3/20.532N_c e^{j20^0} 1.88 I_m e^{-j20^0} = 3/2 N_c I_m e^{j0^0}$$

With the AT of the other two winding sets, abc1 and abc2 may be equal to $1.5N_cI_m$ AT each. Further, the total MMF magnitude of the four sets may be $4.5N_cI_m$, which is the same as the total MMF production of a nine-phase stator with three three-phase winding sets, but with six-stator terminals. Thus, in certain embodiments, it may be possible to achieve high performance of a nine-phase winding with the terminal behavior of a six-phase machine.

As compared to conventional asymmetrical six-phase IM, certain embodiments may provide a P6P IM that achieves improvements in the winding factor. For example, the same stator, rotor, and copper volumes may be assumed for both conventional asymmetrical six-phase IM and P6P IM of certain embodiments. An existing 4-pole, 1.5 kW three-phase IM with 36 stator slots and 28 rotor bars may be rewound with the winding layout illustrated in FIG. 2, and with the same conductor size and number of conductors per slot, and the same filling factor.

According to certain embodiments, the same stator may be rewound as an asymmetrical six-phase winding, which approximately yields the same harmonic content of the MMF distribution as the P6P IM layout. Further, the employed asymmetrical six-phase winding may include two single layer three-phase windings shifted in space by 30°. For this slot number, the number of slots per phase per pole may equal three, which corresponds to a winding factor of 0.9598. Additionally, the MMF distributions of both conventional and the P6P IM winding layouts may be compared, assuming a unity phase current.

Figure 3A:
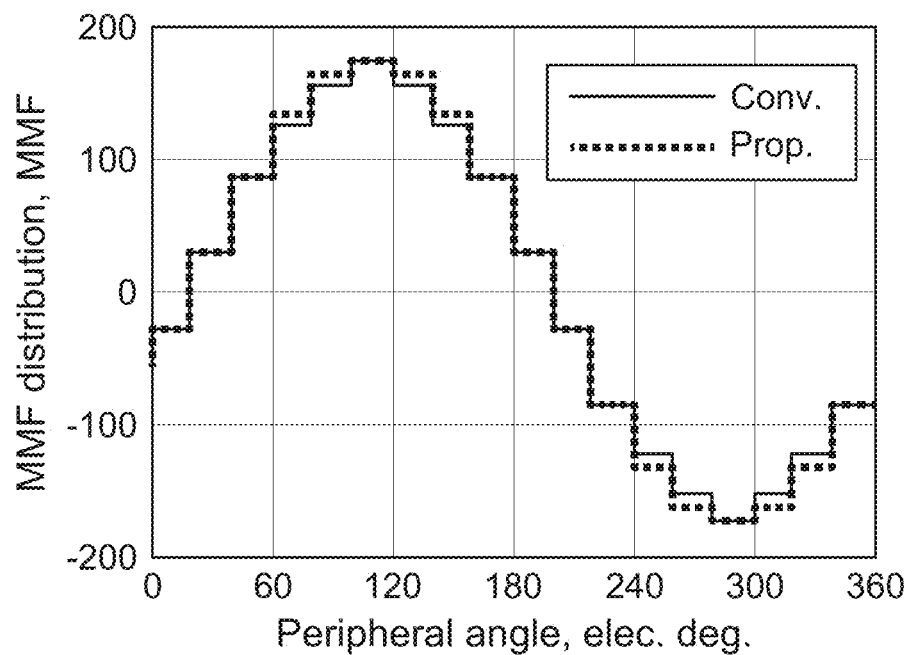
FIG. 3a illustrates a magneto motive force (MMF) distribution and corresponding spectra of a conventional asymmetrical (or split-phase) six-phase (A6P) and the P6P winding layouts, according to an embodiment.
Figure 3B:
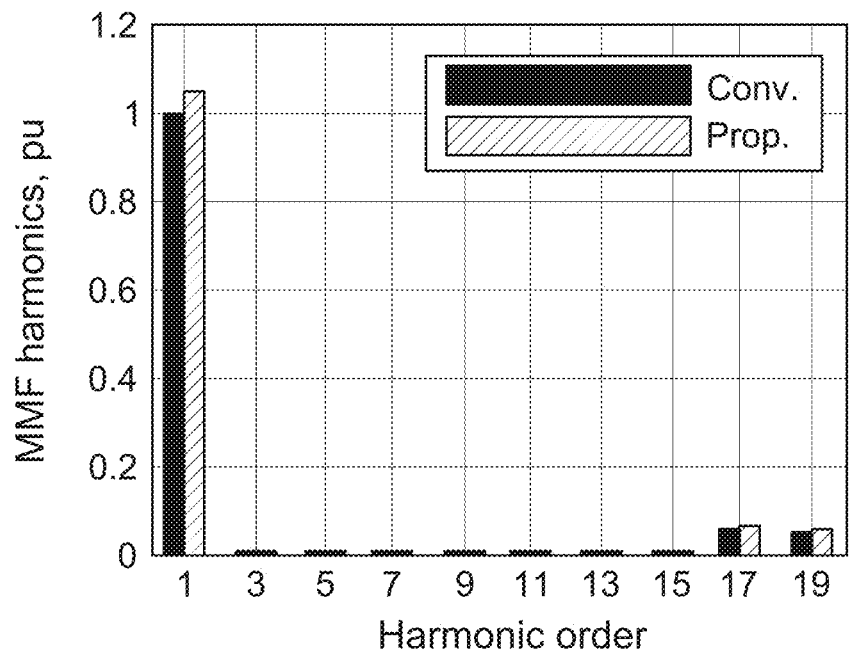
FIG. 3b illustrates another MMF distribution and corresponding spectra of the conventional A6P and the P6P winding layouts, according to an embodiment.

FIG. 3a illustrates an MMF distribution and corresponding spectra of a conventional asymmetrical (or split-phase) six-phase (A6P) and the P6P winding layouts, according to an embodiment. Further, FIG. 3b illustrates another MMF distribution and corresponding spectra of the conventional A6P and the P6P winding layouts, according to an embodiment. As illustrated in FIGS. 3a and 3b, the MMF distribution may generally be of high quality, and the lowest order harmonics may be the 17th and 19th. As further illustrated in FIGS. 3a and 3b, an approximate 5% gain in the fundamental torque producing flux component may be achieved with the winding employed, according to one embodiment.

Figure 4A:
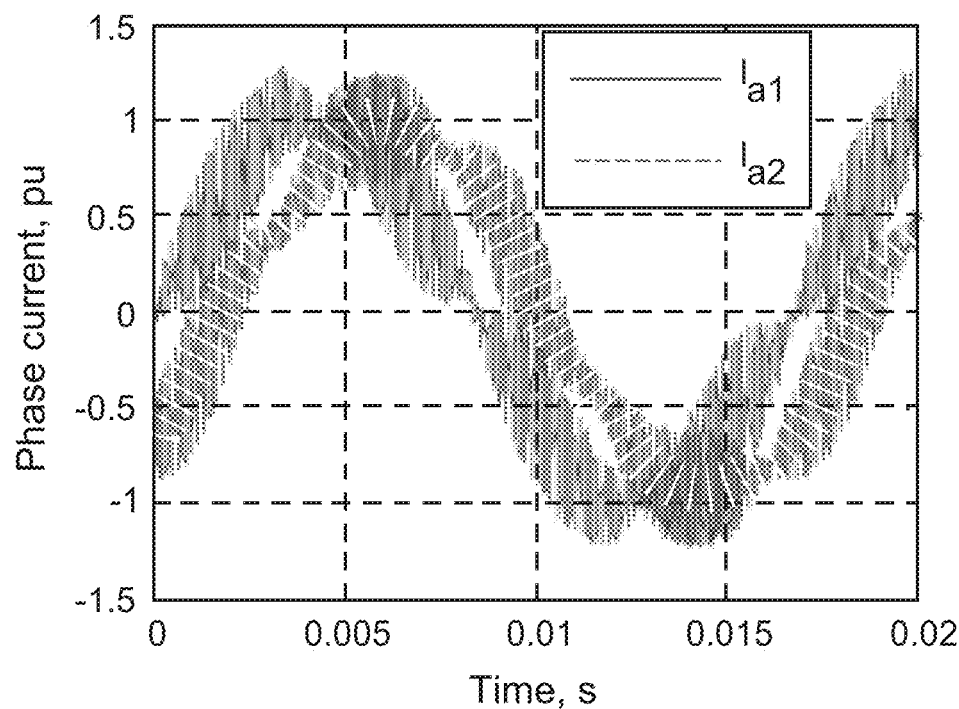
FIG. 4a illustrates per unit experimental current waveforms for phase a in each three-phase group of an asymmetrical six-phase induction motor (IM), according to an embodiment.
Figure 4B:
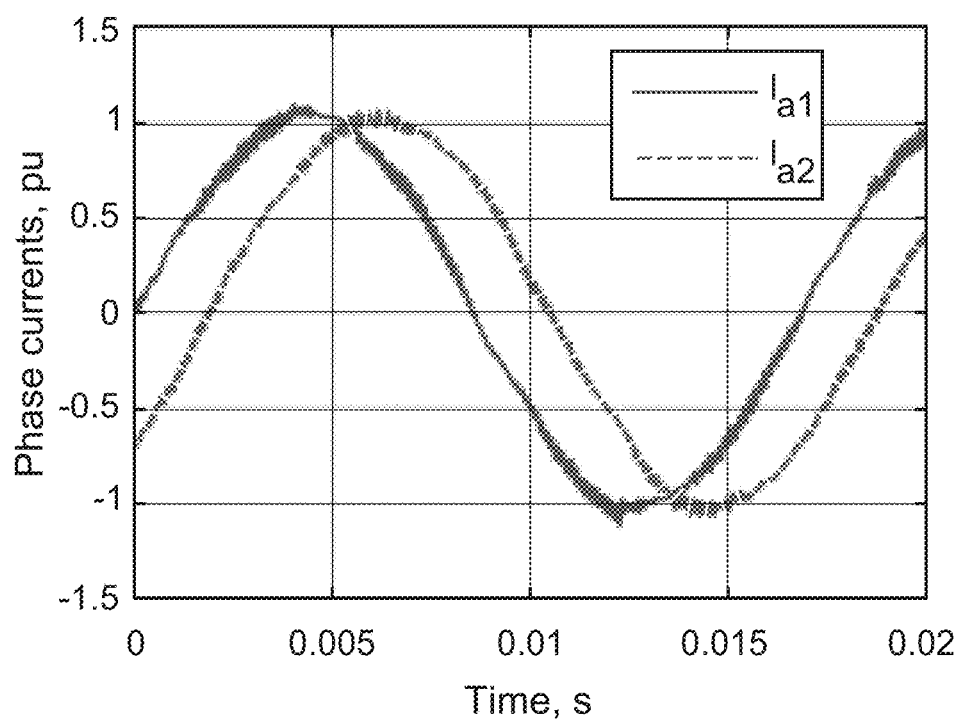
FIG. 4b illustrates per unit experimental current waveforms for phase a in each three-phase group of the P6P winding, according to an embodiment.

FIG. 4a illustrates per unit experimental current waveforms for phase a in each three-phase group of an asymmetrical six-phase IM, according to an embodiment. Further, FIG. 4b illustrates per unit experimental current waveforms for phase a in each three-phase group of P6P winding, according to an embodiment. As illustrated in FIGS. 4a and 4b, it may be possible to achieve improvements in the stator current quality and significant improvements of the stator current waveform for the same switching frequency. For example, by employing a single layer winding, the induced circulating currents due to the mutual leakage coupling between separate layers in a conventional six-phase winding may be highly suppressed.

As illustrated in FIGS. 4a and 4b, a comparison of the experimental full-load current waveform under open-loop control and conventional pulse width modulation (PWM) for an available conventional asymmetrical six-phase machine with the P6P winding layouts is provided. In particular, FIGS. 4a and 4b illustrate significant improvements in the current waveform due to the notable increase in the secondary subspace impedance when a single layer winding is adopted.

According to certain embodiments, the performance under a postfault operation may be a valuable performance index that may also be investigated when considering any multiphase machine. For instance, the postfault operation may be based on producing a balanced positive fundamental current component, $\bar{i}_{\alpha\beta}^+$, while the negative fundamental component, $\bar{i}_{\alpha\beta}^-$, may be controlled to zero. Fulfilling these two conditions simultaneously may maximize the torque production while ensuring zero torque ripple from the fundamental subspace.

In certain embodiments, two optimization criteria may be applied, including, for example, maximum torque (MT) and minimum loss (ML). According to certain embodiments, the required optimal currents that ensure these two optimization criteria for the P6P winding layout and the conventional six-phase machine are provided in Table 1 illustrated in FIG. 5. In particular, FIG. 5 illustrates a table of optimal currents under different postfault strategies for the P6P and the traditional A6P windings, according to an embodiment. As shown in Table 1, the comparison is given for both possible neutral arrangements, namely isolated neutrals (2N) and single neutral (1N) arrangements. The table also shows the expected copper loss for rated output, $P_{loss}$, and the maximum achievable torque, $T_x$, when all healthy phases are limited to 1 pu.

According to certain embodiments, the maximum achievable torque may be obtained from the reciprocal of the phase that carries maximum current under rated output torque. With certain embodiments, it may be possible to outperform conventional A6P winding under different winding arrangements since it may generally correspond to a lower copper loss for the same rated output power, and a higher maximum achievable torque for the same rated line current. Thus, under the MT strategy, the gain in torque/current ratio of the P6P may be higher under the 2N arrangement. In another embodiment, a higher improvement in the torque/current ratio may be achieved for the 1N arrangement under the ML mode.

Figure 6:
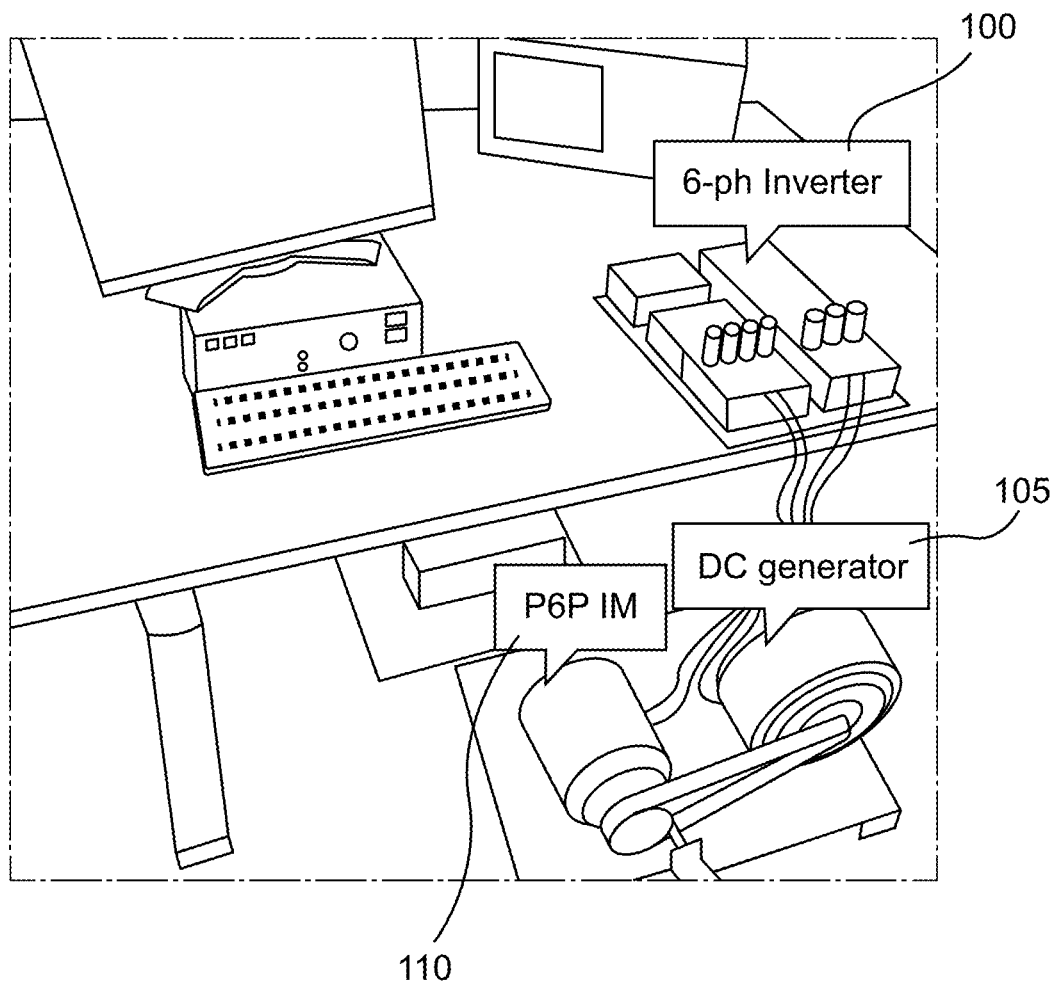
FIG. 6 illustrates a P6P induction machine, according to an embodiment.

FIG. 6 illustrates a P6P induction machine, according to an embodiment. As illustrated in FIG. 6, the P6P induction machine includes a 6-ph inverter 100. The P6P also includes a DC generator 105 and P6P IM 110. According to certain embodiments, the P6P winding layout may be verified by rewinding an existing 4-pole, 1.5 Hp three-phase IM with 36 stator slots, which is similar to the stator core illustrated in FIGS. 1 and 2. The number of conductors per slot for the machine may be 60 conductors with a conductor diameter of 0.85 mm. The same number of turns per coil (60 turns) and the same conductor diameter may be used for the winding groups abc1 and abc2 of FIG. 2.

According to certain embodiments, the number of turns per coil for the other two winding groups abc3 and abc4 may be 0.532×60=32 turns. The total number of conductors per slot for the corresponding stator accommodating these two winding groups may be 32×2=64 conductors. Further, in certain embodiments, for mechanical loading purposes, the IM may be coupled to a permanent magnet DC generator. Further, the stator may be fed from two separate three-phase inverters and fed from a common DC-link voltage of 300V.

In an embodiment, a pulse width modulation at 5 kHz may be used to control the two inverters. In addition, a digital signal processor board eZdsp TM may be used to implement the machine control, while online measurements may be captured using a controller area network (CAN) bus.

Figure 7:
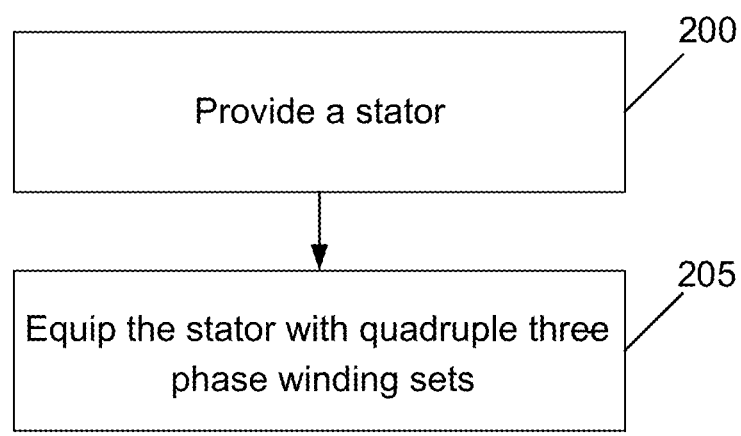
FIG. 7 illustrates a flow diagram of a method, according to an example embodiment.

FIG. 7 illustrates an example flow diagram of a method, according to an example embodiment. In certain example embodiments, the flow diagram of FIG. 4 may be performed a pseudo six-phase (P6P) machine, for instance, similar to the P6P IM 110 illustrated in FIG. 6. According to one example embodiment, the method of FIG. 10 may include initially, at 200, providing a stator. The method may also include, at 205, equipping the stator with quadruple three-phase winding sets with concentrated fully-pitched winding.

According to an embodiment, the quadruple three-phase winding sets may be connected in such a way that emulates a six-phase stator. In another embodiment, the quadruple three-phase winding sets have the same conductor cross-sectional area. In a further embodiment, the quadruple three-phase winding sets comprise a plurality of winding groups.

In certain embodiments, the plurality of winding groups may include a plurality of inductors. In other embodiments, the pseudo six-phase machine may be an induction motor type of a synchronous motor type. According to another embodiment, the pseudo six-phase machine may have the same number of stator slots per pole. In an embodiment, a first winding group and a second winding group may be connected in series, and a third winding group and a fourth winding group may be connected in series to provide equivalent three-phase winding groups. In a further embodiment, the third winding group and the fourth winding group may be placed together during a winding process. According to another embodiment, the third winding group and the fourth winding group may each have a number of turns that is 0.532 times a number of turns of the first winding group and the second winding group.

Certain embodiments described herein provide several technical improvements, enhancements, and/or advantages. In some example embodiments, it may be possible to provide a winding layout that is suitable for high-power medium-voltage machines based on dual three-phase winding. According to other embodiments, it may be possible to employ a single layer fully-pitched winding with a unity winding factor and a 5% enhancement in the torque/current ratio. It may also be possible to employ a single layer winding to increase the achievable winding fill factor, and simplify the insulation requirements as well as the winding process. In addition, being based on a single layer winding layout, it may be possible to increase the secondary subspace impedance since the mutual leakage flux component may be eliminated. As such, it may be possible to improve the stator current waveform.

According to certain embodiments, it may further be possible to provide a solution that offers high performance of a nine-phase winding with the terminal behavior of a six-phase machine. In other embodiments, it may be possible to outperform conventional A6P winding under different winding arrangements since certain embodiments may correspond to a lower copper loss for the same rated output power, and a higher maximum achievable torque for the same rated line current. Further, in certain embodiments, it may be possible to improve torque density and performance in comparison to existing winding topologies. In other embodiments, it may be possible to improve the stator current waveform, which allows for a lower switching frequency while reserving a high-performance motor drive operation.

One having ordinary skill in the art will readily understand that the invention as discussed above may be practiced with steps in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments.

We claim:

1. A pseudo six-phase machine, comprising:
 a stator equipped with quadruple three-phase winding sets with concentrated fully-pitched winding, and six-stator terminals; and
 two single layer three-phase windings shifted in space by 30°,
 wherein the quadruple three-phase winding sets are connected in such a way that emulates a nine-phase stator,
 wherein the quadruple three-phase winding sets have a same conductor cross-sectional area,
 wherein the quadruple three-phase winding sets comprise a plurality of winding groups,
 wherein a first winding group and a second winding group is connected in series, and a third winding group and a fourth winding group is connected in series to provide equivalent three-phase winding groups, and
 wherein the third winding group and the fourth winding group are placed together in a same slot during a winding process.

2. The pseudo six-phase machine, according to claim 1, wherein the plurality of winding groups comprises a plurality of inductors.

3. The pseudo six-phase machine, according to claim 1, wherein the pseudo six-phase machine is an induction motor type of a synchronous motor type.

4. The pseudo six-phase machine, according to claim 1, further comprising the same number of stator slots per pole.

5. The pseudo six-phase machine, according to claim 1, wherein the third winding group and the fourth winding group each have a number of turns that is 0.532 times a number of turns of the first winding group and the second winding group.

6. A method of operating a pseudo six-phase machine, comprising:
 providing a stator; and
 equipping the stator with quadruple three-phase winding sets with concentrated fully-pitched winding, and six-stator terminals,
 wherein the pseudo six-phase machine comprises two single layer three-phase windings shifted in space by 30°,
 wherein the quadruple three-phase winding sets are connected in such a way that emulates a nine-phase stator,
 wherein the quadruple three-phase winding sets have the same conductor cross-sectional area,
 wherein the quadruple three-phase winding sets comprise a plurality of winding groups,
 wherein a first winding group and a second winding group is connected in series, and a third winding group and a fourth winding group is connected in series to provide equivalent three-phase winding groups, and
 wherein the third winding group and the fourth winding group are placed together in a same slot during a winding process.

7. The method according to claim 6, wherein the plurality of winding groups comprises a plurality of inductors.

8. The method according to claim 6, wherein the pseudo six-phase machine is an induction motor type of a synchronous motor type.

9. The method according to claim 6, wherein the pseudo six-phase machine comprises the same number of stator slots per pole.

10. The method according to claim 6, wherein the third winding group and the fourth winding group each have a number of turns that is 0.532 times a number of turns of the first winding group and the second winding group.

* * * * *